UNITED STATES PATENT OFFICE.

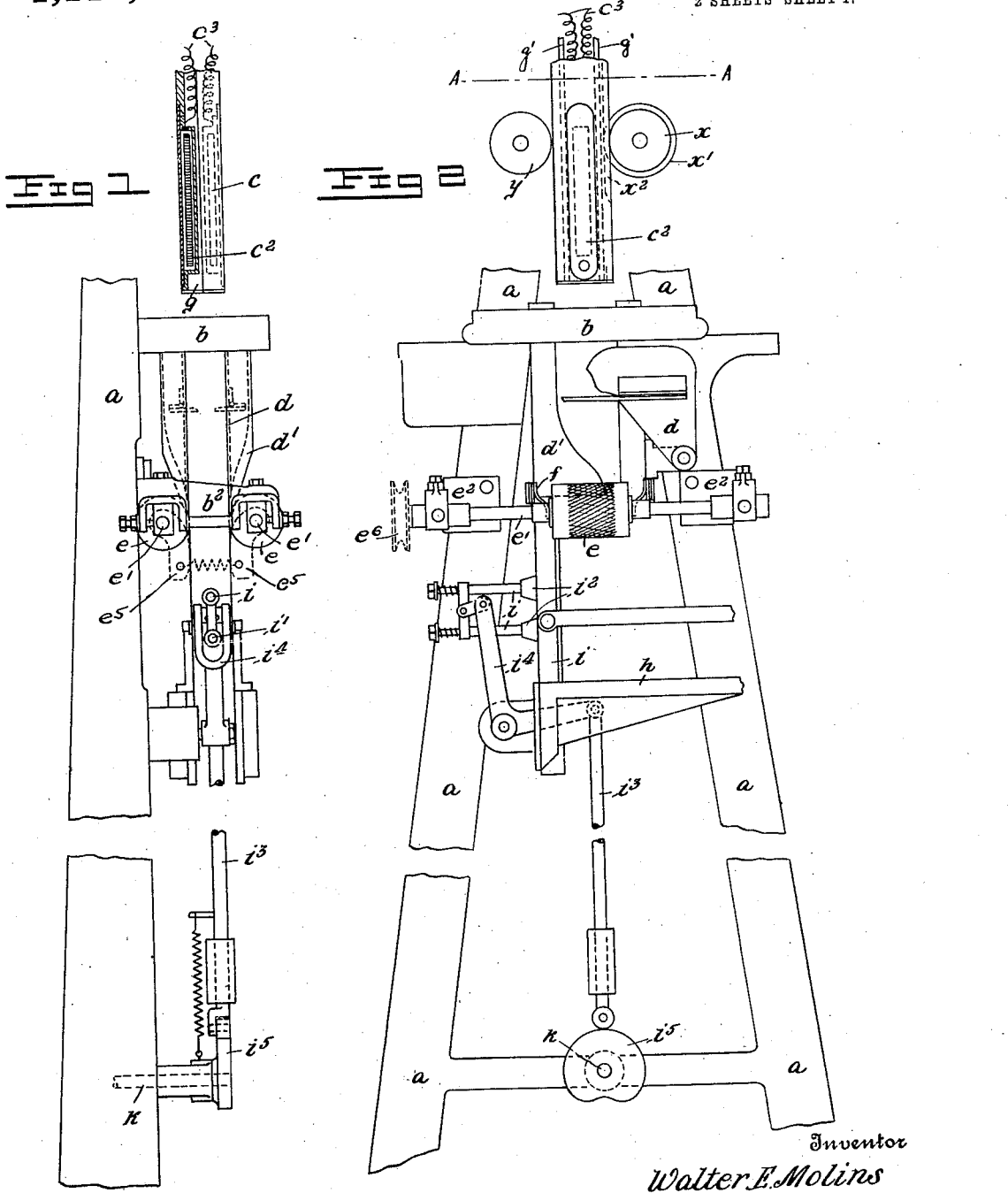

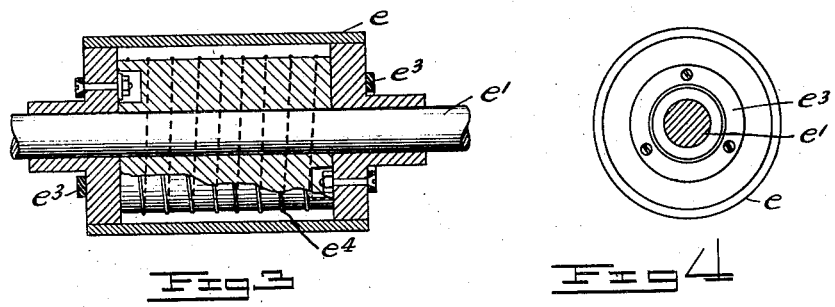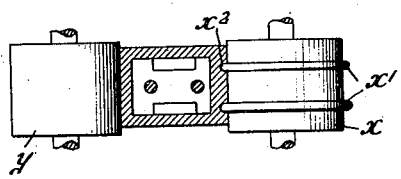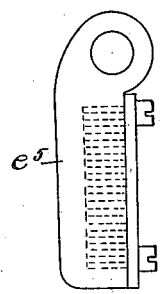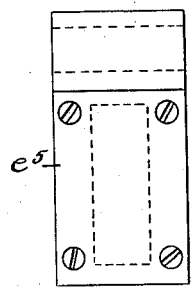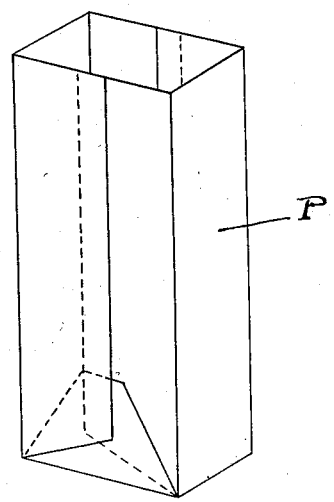

WALTER EVERETT MOLINS, OF LONDON, ENGLAND.

PACKET-MAKING MACHINE.

1,115,716.   Specification of Letters Patent.   Patented Nov. 3, 1914.

Application filed March 13, 1913. Serial No. 754,103.

*To all whom it may concern:*

Be it known that I, WALTER EVERETT MOLINS, a citizen of the United States of America, residing in London, England, have invented certain new and useful Improvements in Packet-Making Machines, of which the following is a specification.

This invention relates to a machine for making packets of lead or other metal foil and it has for its object to provide a machine in which the lead or other foil is wrapped around a suitable former and the overlapping metal fused or softened by the application of heat so that a homogeneous joint is formed.

Now according to the present invention I effect the fusing or softening of the metal by the simultaneous application of heat upon the inside and outside of the seam or joint of the packet.

In carrying the invention into effect I may employ a plunger or former upon which the packet is formed by wrapping around it the metal foil, any suitable mechanism being provided for this purpose, such for instance as that described in my prior U. S. application, Seriel Number 670,137 filed January 9, 1912, which, forming no part of the present invention, is only generally shown in the accompanying drawings. The former, however, is hollow and has disposed within it a heater preferably in the form of an electric resistance coil which is suitably insulated from the plunger and to which current is supplied either by means of leads connected to the terminals of the heater and passing through the former or in any other suitable manner. Coöperating with the said former and arranged to act upon the sides of the packet after the folds have been made are rollers which may be either rotated by their contact with the packet upon the former, or they may be positively driven in any suitable manner. For instance, the grooved pulleys $e^6$ may be driven by a belt through a countershaft receiving motion in the same manner off the main spindle $k$ of the machine.

In order that the invention may be the better understood drawings are appended showing the application of the invention to a machine such as forms the subject of the Letters Patent No. 1116 of 1911, and in which:—

Figure 1 is a side elevation of a part of the machine, the plunger being shown in section. Fig. 2 is a front elevation of the same. Fig. 3 is a longitudinal sectional view of one of the heating rollers. Fig. 4 is an end view of the same. Fig. 5 is a cross sectional view on line A A Fig. 2. Figs. 6 and 7 are front and side views respectively of a modified form of heater which may be substituted for the heating rollers. Fig. 8 is a perspective view of a packet.

Referring to the appended drawings $a$ indicates the frame of the machine upon the front of which are brackets $b$ upon which the foil is placed ready for the operation of the plunger $c$ shown in half section, Fig. 1, which is caused to reciprocate in any convenient manner, and is maintained in position by means of rollers such as $x$ $y$ of which only two are shown and of which those $x$ have projections such as $x^1$ engaging channels $x^2$ in the side of the plunger. The function of the said rollers is to provide suitable roller bearings and guides for the heated reciprocating plunger to serve as guides therefor and prevent lateral movement thereof.

$d$ indicates a tilting folder such as that described in the aforementioned patent and with which coöperates a fixed folder $d^1$.

The plunger $c$ just referred to is hollow and has secured to it on each side a heater $c^2$ in the form of a resistance coil of any suitable construction, and which coils are connected in series and are supplied with electricity through the leads $c^3$, Figs. 1 and 2. By this means the sides of the plunger are raised to such a temperature that the metal when wrapped around it is sufficiently heated to, so to speak, soften it to the extent that when the folded packet comes into contact with the exterior heating device the desired fusion of the metal will take place along the joint or seam of the packet P, Fig. 8.

The exterior heating device just referred to comprises a roller $e$ of which two are provided, one disposed upon each side of the line of movement of the former, and each so arranged that they contact with the sides of the packet immediately after the operation of the aforesaid fixed folding bodies $d^1$. In the present instance the rollers are mounted upon spindles $e^1$ for which bearings are provided upon brackets $e^2$ secured to the frame $a$. The rollers $e$ are hollow and have arranged within them a resistance coil $e^4$ Fig. 3, terminating at each end in a ring $e^3$ disposed upon the outer surface of the ends of the roller and which ends are formed of some nonconducting material, or some other provision is made for securing the insulation of the rings $e^3$. Electricity is supplied to the coils on the rollers by means of the brushes $f$ which bear against the aforesaid rings $e^3$. The surface of the rollers may be knurled or otherwise treated so that the formation of a plain strip of metal on the seam is avoided.

The removal of the packets from the plunger may be effected by means of the stripping plate $g$ attached on the bottom of the plunger to the rods $g^1$ within the plunger. The packets when discharged are received upon the table $h$ and are moved forward thereon by means of the plate $i$ attached to rods $i^1$ passing through guides $i^2$ and operated by means of the rod and lever $i^3$ and $i^4$, and the cam $i^5$.

Obviously the construction and arrangement of the parts may be varied as may be required to suit the requirements of individual cases, and if desired, the rollers may be replaced by heated shoes, as shown in dotted lines at $e^5$ in Fig. 1, and separately in Figs. 6 and 7. Again the rollers instead of, as illustrated, being driven by friction from the plunger, may be positively operated by means of pulleys $e^6$ on the roller shaft $e^1$, see dotted lines Fig. 2, so that they assist in removing the packet from the plunger.

Having now particularly described and ascertained the nature of my said invention, I declare that what I claim is:—

1. In a machine for forming packets of metal foil, the combination with a plunger, of means for heating said plunger, means for folding a metal foil blank about said plunger to form a packet with overlapping edges extending longitudinally of said plunger, and means for heating said packet on the exterior along the overlapped edges to fuse the meeting edges of the packet.

2. In a machine for forming packets of metal foil, the combination with a plunger, of means for heating said plunger, means for folding a metal foil blank about said plunger to form a packet with overlapping edges extending longitudinally of said plunger, and means for simultaneously pressing and heating said packet on the exterior along the overlapped edges to seal the same.

3. In a machine for forming packets of metal foil, the combination with a plunger, and means for folding a metal foil blank about said plunger, of a heating means carried by said plunger on opposite sides thereof, and an external heating means operating in conjunction with each internal heating means carried by the plunger to heat the meeting edges of said packet within and without and fuse the same.

4. In a machine for forming packets of metal foil, the combination with a plunger, and means for folding a metal foil blank about said plunger, of a heating means carried by said plunger on opposite sides thereof and movable therewith, and an external heating means mounted on the machine frame on each side the path of movement of the plunger past which said packet is carried by the plunger and operating in conjunction with the heating means on said plunger to heat the meeting edges of said packet within and without and fuse the same.

5. In a machine for forming packets of metal foil, the combination with a plunger, and means for forming a metal foil blank about said plunger, of a heating means carried by said plunger on opposite sides thereof, and an external heating means below the folding means on each side the path of movement of the plunger adapted to operate in conjunction with the heating means on the plunger to fuse the meeting edges of the packet as it is being ejected from the folding devices.

6. In a machine for forming packets of metal foil, the combination with a plunger, and means for folding a metal foil blank about said plunger, of relatively fixed heating means below the folding mechanism on each side the path of movement of said plunger adapted to heat the lapped edges of said packet on their outer sides, and a movable heating device on each side of said plunger for heating the inner sides of said lapped edges, said heating devices coöperating to fuse said edges and form inseparable joints.

7. In a machine for forming packets of metal foil, a plunger, means for folding a metal foil blank thereabout so that the edges thereof overlap, and a roller having a knurled exterior for pressing the overlapping edges against the plunger, and means for heating said roller to fuse the said edges together.

8. In a machine for forming packets of metal foil, a plunger, means coöperating with said plunger to fold the foil blank thereupon with overlapping edges extending along opposite sides of said plunger, means for heating said plunger on the interior to heat the overlapping edges on the inner side, rollers adapted to engage the opposite sides of the plunger and roll on the overlapped edges to press the same, and means for heating said rollers to heat the exterior of the overlapped edges as they pass said rollers.

9. In a machine for forming packets of metal foil, a plunger, means coöperating with said plunger to fold a metal blank thereupon with the edges thereof overlapping on opposite sides of said plunger, rollers arranged on opposite sides of the path of movement of the plunger to engage the overlapping edges, said rollers having heat conducting cylindrical portions, electric heating coils disposed on the interior of said rollers near said heat conducting portions, and means for maintaining electrical connection with the ends of said coils as the rollers rotate to heat said rollers for heating the overlapping edges as the plunger passes between the rollers.

10. In a machine for forming packets of metal foil, a plunger, means coöperating with said plunger to fold the foil blank thereupon with overlapping edges extending along opposite sides of said plunger, means for heating said plunger on the interior to heat the overlapping edges on the inner side, rollers adapted to engage the opposite sides of the plunger and roll on the overlapped edges to press the same, and means for heating said rollers to heat the exterior of the overlapped edges as they pass said rollers, a receiving table below the rollers adapted to receive the packet therefrom, and a pusher for advancing each packet received by the table, laterally on the table to move the same out of the way of the next following packet.

11. In a machine for forming packets of metal foil, a plunger, means coöperating with said plunger to fold the foil blank thereupon with overlapping edges extending along opposite sides of said plunger, means for heating said plunger on the interior to heat the overlapping edges on the inner side, rollers adapted to engage the opposite sides of the plunger and roll on the overlapped edges to press the same, and means for heating said rollers to heat the exterior of the overlapped edges as they pass said rollers, a horizontal table disposed below said rollers adapted to receive the packet therefrom, an upwardly extending pusher at one side of said table, means for guiding said pusher substantially horizontally to advance the packet along the table out of the way of the next following packet, and automatic means for actuating said pusher.

12. In a machine for forming packets of metal foil, in combination, a reciprocating plunger, means for supporting a blank in the path of the plunger so as to be advanced by said plunger, folding devices coöperating with said plunger to fold the blank about the plunger with the edges of the blank overlapping in a longitudinal direction on said plunger, means for heating the overlapped edges from the inner side of said plunger, and means for pressing and heating the overlapping edges on the exterior to fuse the same.

In witness whereof I have hereunto affixed my signature in the presence of the undersigned witnesses this twenty-second day of February in the year of our Lord 1913.

WALTER EVERETT MOLINS.

Witnesses:
WILLIAM HOLMES,
ARTHUR GEORGE GOBELL.